US005161871A

United States Patent [19]

Baliozian

[11] Patent Number: 5,161,871

[45] Date of Patent: Nov. 10, 1992

[54] DEVICE FOR HOLDING A REMOVABLE ACCESSORY IN POSITION ON A FLASHLIGHT CASING

[76] Inventor: Mardick Baliozian, 175 E. Delaware Pl., Chicago, Ill. 60611

[21] Appl. No.: 713,387

[22] Filed: Jun. 7, 1991

[30] Foreign Application Priority Data

Sep. 25, 1990 [FR] France ............................... 90 11789

[51] Int. Cl.[5] ............................................ G03B 15/02

[52] U.S. Cl. ....................................... 362/18; 362/438; 362/449

[58] Field of Search .................. 362/186, 16, 18, 277, 362/282, 284, 323, 324, 449, 353, 438

[56] References Cited

U.S. PATENT DOCUMENTS 1,567,064 12/1925 La Scola ............................ 362/438
2,491,376 12/1949 Hartman ............................ 362/438
4,388,674 6/1983 Sano ................................... 362/186

FOREIGN PATENT DOCUMENTS 153021 5/1932 Switzerland .

*Primary Examiner*—Stephen F. Husar
*Attorney, Agent, or Firm*—Young & Thompson

[57] ABSTRACT

A device for holding a removable accessory in position on the casing of a flashlight includes retaining members which project outwards from the front wall of the flashlight casing and are placed around an opening through which a light source is passed. The device is also provided with means for simultaneous radial displacement of the retaining members between a position of release and a position of clamping of the accessory by cooperation of the retaining members with the neck of the accessory, and elements for ensuring that the means employed for displacement of the retaining members are controlled through the intermediary of a ring disposed coaxially with the opening through which the light source is passed. The retaining members are guided with radial slideways.

12 Claims, 3 Drawing Sheets

DEVICE FOR HOLDING A REMOVABLE ACCESSORY IN POSITION ON A FLASHLIGHT CASING

BACKGROUND OF THE INVENTION

1. Field of the Invention

This invention relates to flashlights and more specifically to a device for removably holding in position an accessory such as a reflector or a light box on the casing of a flashlight.

2. Description of the Prior Art

A number of known devices of this type have already been employed in the prior art for changing an accessory or else for detaching the accessory from the casing in order to facilitate transport while at the same time ensuring better protection of the casing.

In one of these known devices, a reflector is held in position on the flashlight casing by means of a bayonet coupling. This device requires the use of a part which is mounted separately on the reflector and is also liable to fall after it has been rotated through an angle of a few degrees.

Another known device comprises means for connecting the reflector to the flashlight casing and consisting of studs which are placed on the neck of the reflector and are intended to cooperate with a helical groove formed in the casing. This solution, however, also calls for a part which is added on the reflector.

In another known device, the reflector is held in position on the flashlight casing by means of several retaining tongues which are attached to the casing and urged towards the reflector by screws so as to be applied against the internal wall of the reflector neck in order to maintain the reflector in position by clamping.

There is also known another device comprising three clamps or claws which project outwards from the casing and are formed at one end of arms mounted for radial pivotal displacement within the flashlight casing. The opposite ends of these arms are connected to a rotary control plate by means of a link-rod system comprising articulated and pivoting levers.

The plate of this device can be rotated by means of a control lever which is rigidly fixed to the plate and this movement of rotation actuates the link-rod system which causes the claw-carrying arms to pivot and thus to bring the claws towards or away from the internal wall of the reflector neck in order to fix or release the reflector.

The device just described has a large number of parts and is very complicated to manufacture since it also has a large number of articulations and stationary shafts.

The aim of the invention is to overcome the disadvantages of the devices mentioned in the foregoing by proposing a holding device which has very few parts, which is simple to manufacture and which is very reliable. By means of this device, an accessory can be securely mounted and very rapidly removed. In addition, the accessory can be conveniently oriented by a movement of rotation while being securely held in position.

SUMMARY OF THE INVENTION

The invention is directed to a device for holding a removable accessory in position on the casing of a flashlight, including retaining members in the form of tongues which project outwards from the flashlight casing and are placed around an opening through which a light source is passed, means for carrying out radial displacement of the retaining members between a position of release and a position of clamping of the accessory by cooperation of said members with the internal circumference of the accessory to be held, and elements for ensuring that the means employed for displacement of the retaining members are controlled through the intermediary of a rotary part. The device is distinguished by the fact that the rotary part is a ring disposed coaxially with the opening through which the light source is passed, and that the retaining members are guided within radial slideways so as to be capable of translational displacement therein.

In accordance with other distinctive features of the invention :

- the means for displacement of the retaining members include grooves formed in the ring and serving to guide studs which are attached to the retaining members, one end of each groove being disposed on a small circle of the ring corresponding to the position of release of the retaining members, the opposite end of said groove being disposed on a larger circle of the ring corresponding to the position of clamping of the retaining members;
- the grooves are rectilinear;
- the grooves are curvilinear;
- each groove has a shape which defines in addition an intermediate position of the retaining members in which these members hold the accessory in position while permitting orientation by free rotation of said accessory;
- the ring is rotatably mounted on an annular flange which is attached to the internal face of the front wall of the casing, and the slideways are formed in said front wall;
- each retaining member has the general shape of an L, the horizontal arm of which is guided within the corresponding slideway;
- the upper end of the vertical arm is bent in such a manner as to extend outwards in an approximately horizontal direction in order to be capable of penetrating into a corresponding slot formed in the periphery of a protective cover near the edge thereof;
- the central zone of the vertical arm of each retaining member has an outwardly directed bend which is capable of cooperating with the internal circumference of a reflector in order to hold the reflector and the cover in position at the same time;
- the control elements include a toothed sector which is rigidly fixed to the ring and disposed in meshing engagement with a pinion, the shaft of said pinion being connected to a knob for controlling the rotation of the ring;
- the ring is rigidly fixed to a control arm which projects outwards from the casing;
- the ring is locked in position axially between the internal face of the front wall of the casing and elements which project transversely from the internal wall of the casing so as to form axial stops.

The invention also relates to a flashlight provided with a holding device in accordance with the distinctive features mentioned in the foregoing.

DETAILED DESCRIPTION OF THE INVENTION

Figure 1:
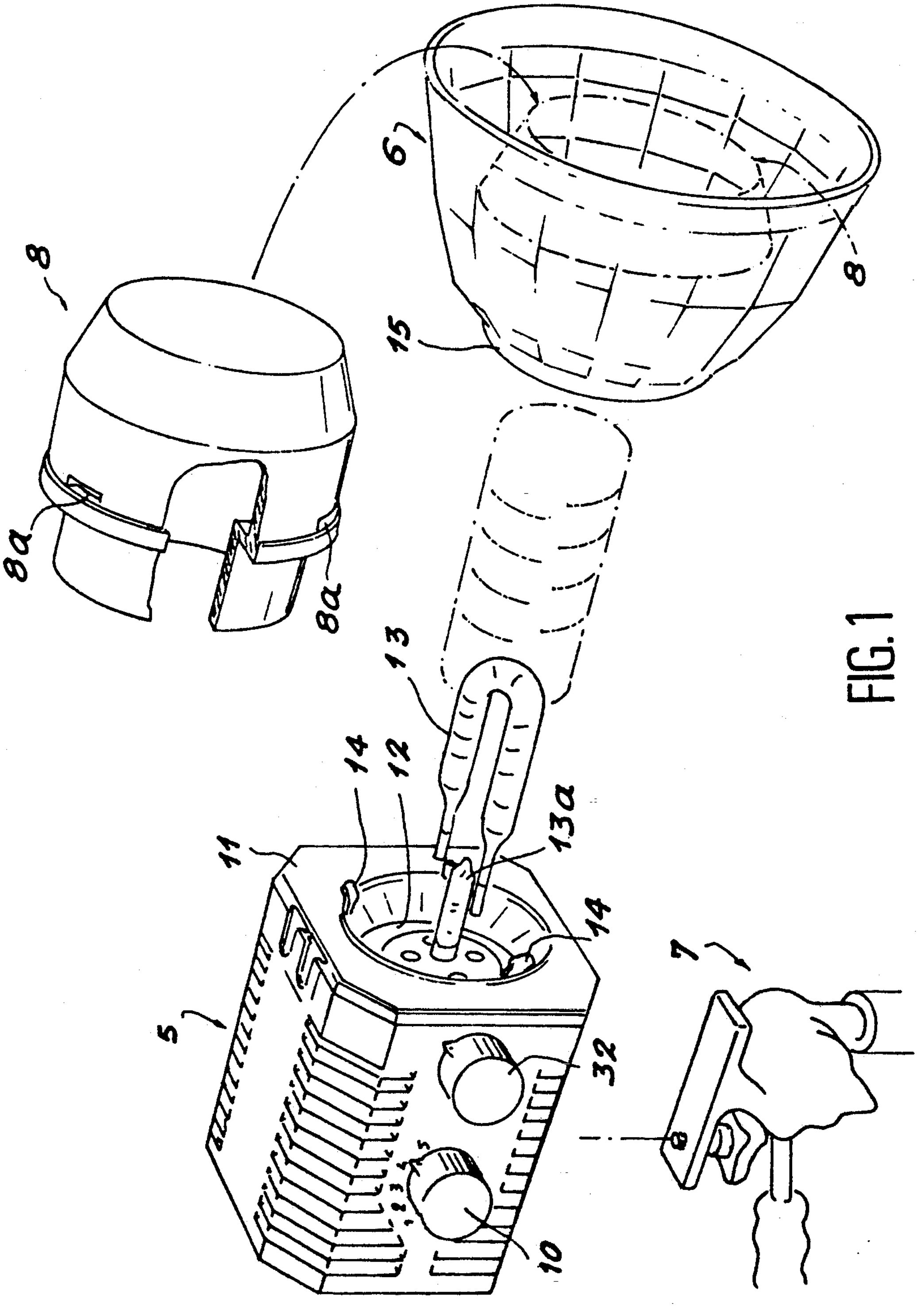
FIG. 1 is an exploded general view in perspective showing a flashlight casing provided with the holding device in accordance with the invention on which is fixed a reflector.

The device in accordance with the invention is intended to be mounted within a flashlight casing 5 in order to hold in position an accessory such as a reflector 6 or a light box or else a protective cover 8 in the form of a generally cylindrical drum or any other accessory, the assembly as a whole being mounted on a stand 7 if so required.

The details of the casing are known per se and will not be described in detail here. The casing is also fitted with a focusing device 9 operated by a control knob 10 placed outside the casing but this device will not be described either since it is already known and has no direct bearing on the invention.

The front portion of the casing 5 is closed by a wall in the form of a plate 11 having an opening 12 through which is passed a light source 13 shown in this example in the form of an elbowed discharge tube and a halogen lamp 13*a*.

The device for holding the reflector 6 in position includes retaining members 14 in the form of tongues which project outwards from the casing 5. The retaining tongues 14 are disposed around the opening 12 and are mounted so as to be displaceable in translation between a position of release and a position of clamping of the reflector 6 by cooperation of the tongues with the neck 15 or simply with the internal circumference of the reflector 6.

The tongues 14 are placed in proximity to the opening 12 and have the general shape of an L. The vertical arm 16 of the L constitutes the retaining member proper and the horizontal arm 17 constitutes a slider which is guided within a respective radial slideway 18 formed in the internal face of the front plate 11 of the casing. The horizontal arm 17 of the retaining tongue 14 is capable of translational displacement through a lateral slot 19 which opens towards the passageway 12 of the light source 13, 13*a*.

In addition, the upper end of the vertical arm 16 of each retaining member 14 is advantageously bent in such a manner as to be directed horizontally outwards in order to be capable of penetrating into a corresponding slot 8*a* are in the periphery of the cylindrical protective cover 8 near the edge thereof or into a similar slot of another accessory.

The retaining members 14 are also capable of holding the reflector 6 and the cover 8 in position at the same time by virtue of the fact that the central zone of the vertical arm 16 of each retaining member has an outwardly directed bend on which the internal circumference of the reflector is applied when the retaining members are moved outwards while the upper ends thereof penetrate at the same time into the corresponding slots 8*a* of the cover 8.

The horizontal arm 17 of each retaining tongue 14 is provided on the face opposite to the vertical arm 16 with a stud 20 which projects within a groove 21 formed in a rotary part 22 for controlling the translational displacement of the tongues 14. The studs and the grooves together constitute means for carrying out the displacement of the retaining members 14.

The rotary part 22 has the general shape of a ring rotatably mounted around an annular flange 23 which is attached to the internal face of the front plate 11 and disposed coaxially with the center of the opening 12.

The ring 22 is locked in position axially between the front plate 11 and projecting lugs 24 which extend transversely from the internal wall of the casing so as to form axial stops.

In the example illustrated in the figures, the device has three grooves 21 corresponding to three retaining members 14 but any other number of grooves and of retaining members may naturally be contemplated.

One end of each groove 21 is located on a small circle of the ring 22 whereas the opposite end thereof is located on a larger circle of the ring so that, during rotation of the ring 22, the stud 20 is displaced along the groove 21 from a position corresponding to release of the reflector 6 to a position corresponding to clamping of said reflector.

Figure 2:
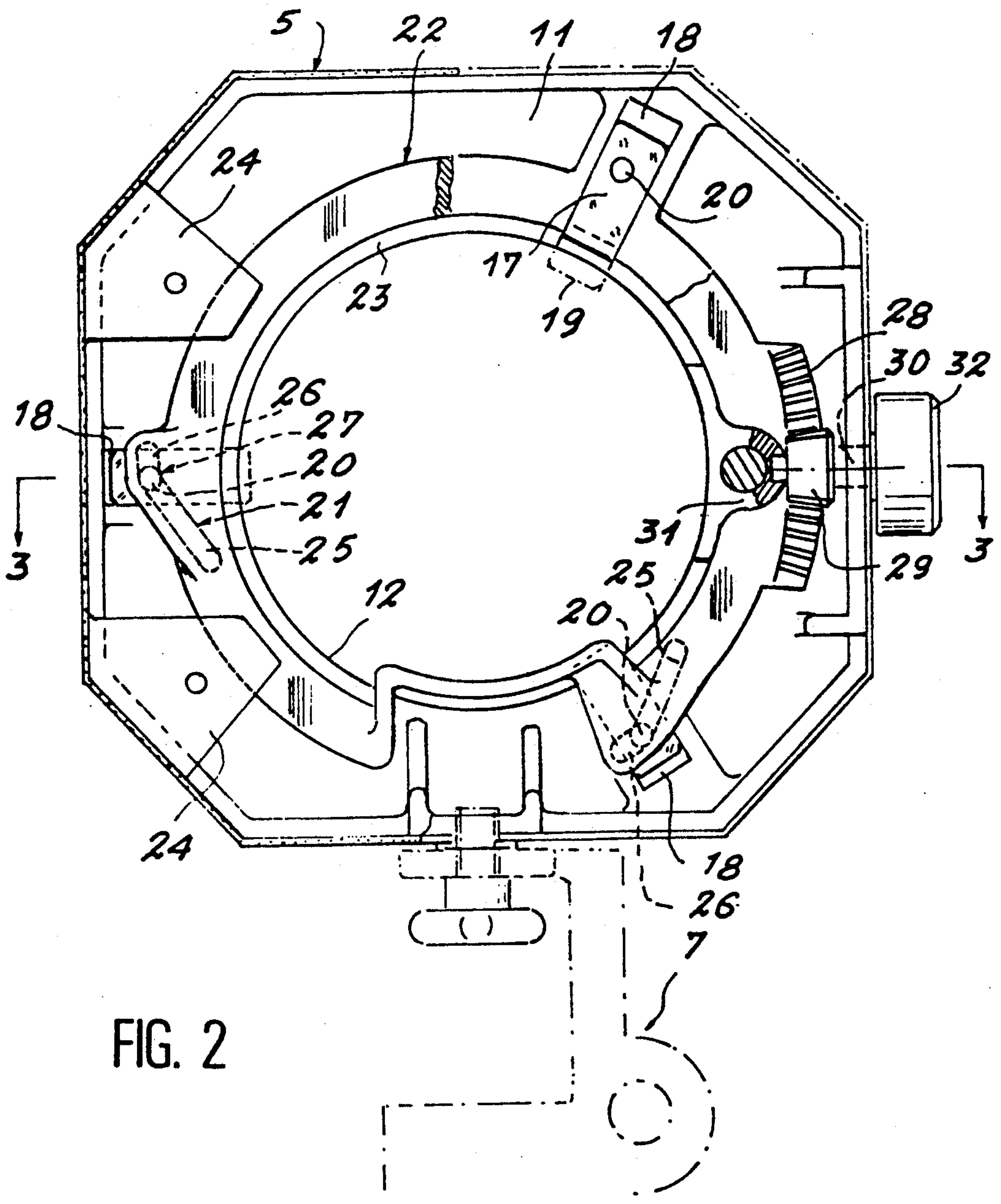
FIG. 2 is a view in transverse cross-section taken along line 2—2 of FIG. 3 and looking on the rear end of the holding device which is mounted within a flashlight casing.
Figure 3:
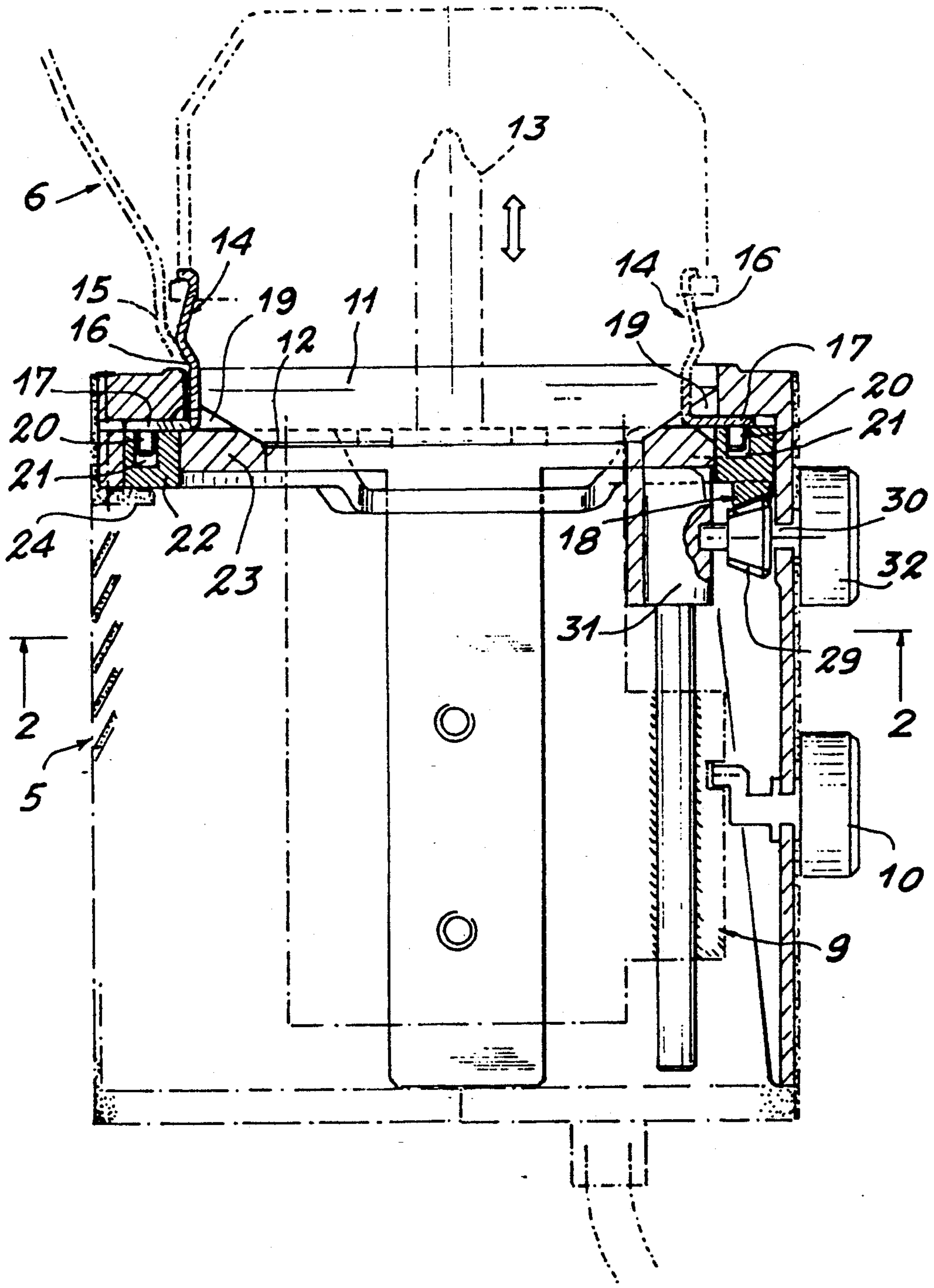
FIG. 3 is a longitudinal sectional view taken along line 3—3 of FIG. 2 and showing the holding device which is mounted within a flashlight casing.

The grooves 21 can be either curvilinear or rectilinear. In the case last mentioned, they are advantageously composed of two rectilinear portions 25, 26 as illustrated in FIG. 2.

In the case illustrated in the figures, one of the portions (namely the portion 25) is of greater length than the other portion 26 and is placed nearer the center of the ring 22.

These two portions 25, 26 of the groove 21 form an angle 27 with each other so as to define in proximity to the location of this angle an intermediate position of the retaining members 14 which permits orientation of the reflector by free rotation while said reflector nevertheless continues to be retained.

The device is provided in addition with elements for controlling or driving the ring 22 in rotation. These elements include a portion of the ring 22 which forms a toothed sector 28, the teeth of which extend axially towards the rear of the casing and are disposed in meshing engagement with a bevel pinion 29. The shaft 30 of the pinion is carried on the one hand by a bearing formed by a hole in a lug 31 which projects from the front plate 11 towards the interior of the casing 5 and on the other hand by a bearing formed by a hole in the casing wall. The shaft 30 is attached to a control knob 32 placed on the external face of the casing.

A more simple variant (not shown in the figures) of the control elements makes provision for a control arm which is rigidly fixed to the ring 22 and projects outwards from the casing through a slot. Said control arm may naturally be formed in one piece with the ring.

The operation of the device in accordance with the invention is simple. Considering at the outset an initial state in which the casing 5 is not fitted with the reflector 6 and the retaining tongues 14 are in their position of release corresponding to the position in which each stud 20 is located at that end of each groove which is placed nearer to the center of the ring, the initial operation consists in passing the neck 15 of the reflector 6 over the retaining tongues 14.

The control knob 32 is then turned so as to rotate the ring 22, with the result that the studs 20 together with the retaining tongues 14 are displaced along the grooves 21 towards the position which corresponds to clamping of the reflector. If necessary, it is possible to stop a moment in the intermediate position corresponding to the position of the studs when they are close to the location of the angle 27 of the grooves in order to orient the reflector or the accessory by rotating it freely while holding it in position on the flashlight.

One then continues to rotate the control knob 32 in order to displace the studs along the short portion 26 of the corresponding groove 21 until they are located in the position in which the reflector 6 is clamped and secured against rotation.

The reflector 6 and the protective cover 8 can also be fixed at the same time by moving the retaining members towards their holding position, with the result that the ends of said members penetrate into the slots 8*a* of the cover while clamping the reflector.

What is claimed is:

1. A device for holding a removable accessory in position on the casing of a flashlight, including retaining members in the form of tongues which project outwards from the front wall of the flashlight casing and are placed around an opening through which a light source is passed, means for carrying out radial displacement of the retaining members between a position of release and a position of clamping of the accessory by cooperation of said members with the internal circumference of the accessory to be held, and elements for ensuring that the means employed for displacement of the retaining members are controlled through the intermediary of a rotary part, wherein the rotary part has the general shape of a ring disposed coaxially with the opening through which the light source is passed, and wherein the retaining members are guided within radial slideways so as to be capable of translational displacement therein.

2. A device according to claim 1, wherein the means for displacement of the retaining members include grooves formed in the ring and serving to guide studs which are attached to the retaining members, one end of each groove being disposed on a small circle of the ring corresponding to the position of release of the retaining members, the opposite end of said groove being disposed on a larger circle of the ring corresponding to the position of clamping of the retaining members.

3. A device according to claim 2, wherein the grooves are rectilinear.

4. A device according to claim 2, wherein the grooves are curvilinear.

5. A device according to claim 1, wherein each groove has a shape which defines in addition an intermediate position of the retaining members in which said members hold the accessory in position while permitting orientation by free rotation of said accessory.

6. A device according to claim 1, wherein the ring is rotatably mounted on an annular flange which is attached to the internal face of the front wall of the casing and wherein the slideways are formed in said front wall.

7. A device according to claim 1, wherein each retaining member has the general shape of an L, the horizontal arm of which is guided within the corresponding slideway.

8. A device according to claim 7, wherein the upper end of the vertical arm of each retaining member is bent in such a manner as to extend outwards in an approximately horizontal direction in order to be capable of penetrating into a corresponding slot formed in the periphery of a protective cover or of any other accessory having similar slots near the edge thereof.

9. A device according to claim 8, wherein the central zone of the vertical arm of each retaining member has an outwardly directed bend which is capable of cooperating with the internal circumference of a reflector in order to hold the reflector and the cover in position at the same time.

10. A device according to claim 1, wherein the control elements include a toothed sector which is rigidly fixed to the ring and disposed in meshing engagement with a pinion, the shaft of said pinion being connected to a knob for controlling the rotation of the ring.

11. A device according to claim 1, wherein the ring is rigidly fixed to a control arm which projects outwards from the casing.

12. A flashlight, wherein said flashlight is fitted with a holding device according to claim 1.

* * * * *